April 14, 1931. L. F. SHEAN 1,800,759
ICE CREAM CONE CUP HOLDER
Filed Oct. 26, 1927
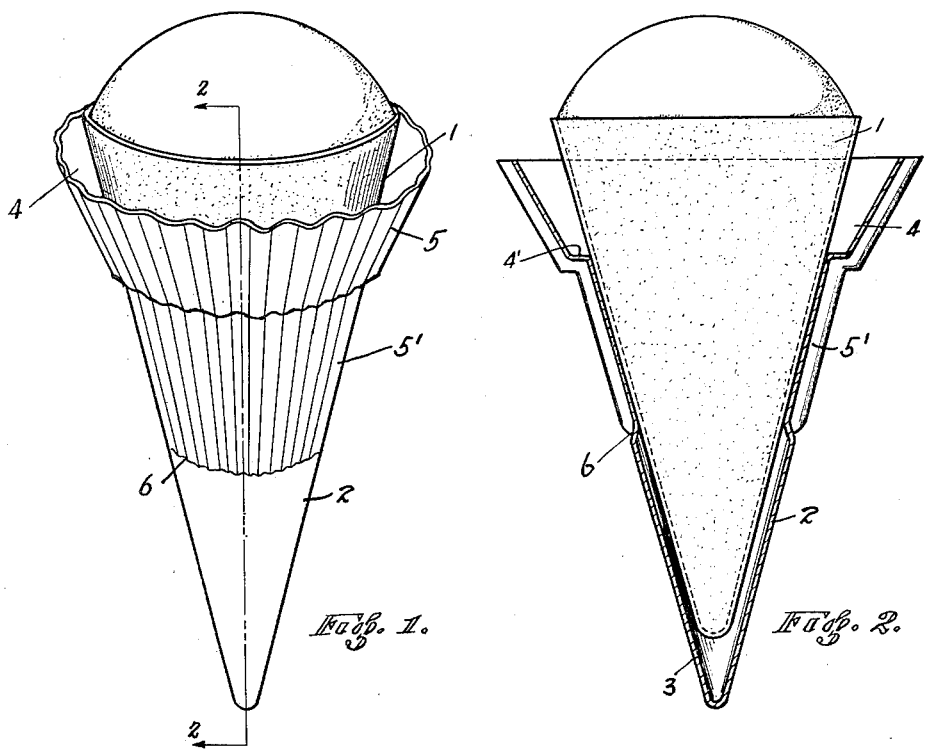
INVENTOR.
LEE F. SHEAN.
BY Munn+Co.
ATTORNEYS.

Patented Apr. 14, 1931

1,800,759

UNITED STATES PATENT OFFICE

LEE F. SHEAN, OF BERKELEY, CALIFORNIA

ICE-CREAM-CONE CUP HOLDER

Application filed October 26, 1927. Serial No. 228,913.

My invention relates to improvements in ice cream cone cup-holders, and it consists in the combinations, constructions, and arrangements hereinafter described and claimed.

An object of my invention is to provide an ice cream cone holder and cup, which is preferably made from a single piece of material, the cup being fashioned for holding an ice cream cone and for catching the drippings from the cone, these drippings being conveyed to the bottom of the cup.

A further object of my invention is to provide a device of the type described which is inexpensive to manufacture, and which is preferably made of a collapsible material so that the lower portion of the cup may be pressed together as the cone is consumed, thus forcing the cone out of the cup where it may be readily eaten.

Other objects and advantages will appear in the following specification, and the novel features of my invention will be particularly pointed out in the appended claims.

My invention is illustrated in the accompanying drawing forming a part of this application, in which:

Figure 1 is a perspective view of the device showing a cone disposed therein; and Figure 2 is a section along the line 2—2 of Figure 1 showing the cone in elevation.

In carrying out my invention I make use of an ice cream cone 1, around which I mount a cup 2. The cup is preferably made cone-shaped so as to act as a support for the ice cream cone 1. The material forming the cup may be paper, which is waxed for holding the melted cream. The bottom 3 of the cup may be pressed together for forcing the cone 1 upwardly. In this way the cone may be moved upwardly as it is eaten.

The cup 2 has a conical-shaped portion 4 that extends away from the upper portion of the cone for providing a catch for the melted cream. The portion 4 is preferably corrugated, as at 5, and the corrugations provide grooves that extend longitudinally of the cup. These grooves extend past the conical-shaped portion 4, and on down to the line 6. It is these longitudinal grooves 5 and 5' that convey the melted cream to the bottom of the cup and prevent it from over-flowing. These grooves could be dispensed with if the outer surface of the cone were rough, as is the case with many types of cones.

From the foregoing description of the various parts of the device, the operation thereof may be readily understood.

I am aware of cone holders for ice cream cones, but I am not aware of a cone cup-holder that performs the double function of retaining the melted cream and of providing a support for the cone. The device is especially suited for children, since it provides a single means for catching all of the cream that drops over the top of the cone. It is well known that this cream usually finds its way upon the dress or suit of the child.

After the cone has been consumed the cup may be used in much the same manner as a drinking cup and the melted cream may be drained from the cup, if desired.

Although I have shown and described one embodiment of my invention, it is to be understood that the same is susceptible of various changes and I reserve the right to employ such changes as may come within the scope of the appended claims.

The conical-shaped portion 4 is spaced away from the cone 1 by a shoulder 4'. This shoulder extends entirely around the cup and acts as a reinforcing member as well as the spacing member already mentioned.

The grooves or flutes 5 extend through the shoulder and are contiguous with the grooves 5'. Melted ice cream falling into the portion 4 will be conveyed to the bottom of the cup by the grooves 5 and 5'. The portion 4 also permits ready eating of the cone.

The waxing of the inner surface of the cup-holder not only provides a liquid tight receptacle, but also provides a smooth surface that permits the cone to slide upwardly in the cup when the lower portion of the cup is collapsed.

I claim:

1. An ice cream cone cup holder comprising a conical-shaped portion having a part thereof corrugated for spacing the bottom of the cup from the cone for receiving melted ice cream and an outwardly-flared portion separated from the conical portion by a reinforcing shoulder.

2. An ice cream cone cup holder comprising a conical-shaped portion having a part thereof corrugated for spacing the bottom of the cup from the cone for receiving melted ice cream and an outwardly-flared portion separated from the conical portion by a reinforcing shoulder, said outwardly-flared portion and reinforcing shoulder being corrugated, the corrugations being aligned with said first-named corrugations.

3. A cup holder for receiving an ice cream cone, said holder extending to a point adjacent to the top of the cone, the upper portion of said holder being flared outwardly for catching all of the drippings from the cone and means for conveying all of the drippings to the bottom of the cup holder.

4. A cup holder for receiving an ice cream cone, said holder extending to a point adjacent to the top of the cone, the upper portion of said holder being flared outwardly for catching all of the drippings from the cone, the wall of said holder being fashioned with grooves extending from the open end of the holder down into the interior of the cup for conveying the drippings toward the bottom of the holder.

LEE F. SHEAN.